US012246417B2

(12) United States Patent
Wu

(10) Patent No.: US 12,246,417 B2
(45) Date of Patent: Mar. 11, 2025

(54) TORQUE WRENCH WITH OVERLOAD WARNING MECHANISM

(71) Applicant: MATATAKITOYO TOOL CO., LTD., Taichung (TW)

(72) Inventor: Yi-Min Wu, Taichung (TW)

(73) Assignee: MATATAKITOYO TOOL CO., LTD., Taichung (TW)

( * ) Notice: Subject to any disclaimer, the term of this patent is extended or adjusted under 35 U.S.C. 154(b) by 240 days.

(21) Appl. No.: 17/955,354

(22) Filed: Sep. 28, 2022

(65) Prior Publication Data

US 2024/0100662 A1 Mar. 28, 2024

(51) Int. Cl.
*B25B 23/142* (2006.01)
*B25B 13/46* (2006.01)

(52) U.S. Cl.
CPC ........ *B25B 23/1427* (2013.01); *B25B 13/465* (2013.01)

(58) Field of Classification Search
CPC . B25B 13/465; B25B 23/1427; B25B 13/467; B25B 24/142; B25B 24/1425
USPC ........................................................ 81/467
See application file for complete search history.

(56) References Cited

U.S. PATENT DOCUMENTS 2,250,941 A * 7/1941 Zimmerman ....... B25B 23/1427 267/128
2,365,419 A * 12/1944 Lockheed ........... B25B 23/1427 73/862.22
2,792,734 A * 5/1957 Larson ................ B25B 23/1425 81/477
3,572,284 A * 3/1971 Rattan ...................... G05G 1/10 116/282
2008/0134800 A1* 6/2008 Escoe ................. B25B 23/1425 73/862.21

FOREIGN PATENT DOCUMENTS

DE 202006004741 U1 * 7/2006 ......... B25B 23/1425
FR 2629383 A * 10/1989 ......... B25B 23/1425
TW I376294 B 11/2012
TW I507273 B 11/2015

OTHER PUBLICATIONS

Office Action dated Apr. 18, 2023 of the corresponding Taiwan patent application No. 111130079.

* cited by examiner

*Primary Examiner* — C. A. Rivera
(74) *Attorney, Agent, or Firm* — Chun-Ming Shih; HDLS IPR SERVICES

(57) ABSTRACT

A torque wrench includes a wrench body, a deformable rod, a torque adjustment mechanism, a switch and an alarm. The wrench body includes a working section and a gripping section. Two ends of the deformable rod are fixed to the working section and the gripping section respectively, and a middle section is formed in-between. The torque adjustment mechanism is installed in the gripping section and includes a knob and an abutting member. The knob adjusts the abutting member to be proximate to or away from the middle section. The switch is disposed between the middle section and the torque adjustment mechanism. The alarm is electrically connected to the switch, and the middle section is in a bending deformation toward the abutting member, when load of the working section is greater than a set torque, to touch the switch and trigger the alarm to generate a warning signal.

6 Claims, 7 Drawing Sheets

TORQUE WRENCH WITH OVERLOAD WARNING MECHANISM

BACKGROUND OF THE DISCLOSURE

Technical Field

The technical field relates to a torque wrench, and more particularly relates to a torque wrench with an overload warning mechanism.

Description of Related Art

Torque wrench is commonly used in the manufacturing industry and other related fields. Since each locking action has strict requirements on the torque value when high-strength bolts or high-strength nuts are locked, therefore the torque wrench is designed to be used by users with a set torque value.

Among the torque wrenches, a manual torque wrench needs to be set to the required torque value before use, and then to lock the bolt or nut until the torque wrench makes a clicking sound, indicating that the torque value has reached the set value. However, most occasions of using the torque wrench take place in a noisy and high-decibel environment, so that the clicking sound is often ignored and the users continue the lock operation, which in turn causes the failure of the locked bolt or nut to meet the required torque requirements.

In view of the aforementioned problems, the discloser proposed this disclosure based on his expert knowledge and elaborated researches to overcome the problems of the related art.

SUMMARY OF THE DISCLOSURE

Therefore, it is a primary object of this disclosure to provide a torque wrench that the alarm may be triggered when the load of the torque wrench reaches the set torque, and the alarm may still achieve the effect of warning the users in a noisy and high decibel environment.

In order to achieve the aforementioned object, the present disclosure provides a torque wrench with an overload warning mechanism including a wrench body, a deformable rod, a torque adjustment mechanism, a switch and an alarm. The wrench body includes a working section and a gripping section connected to the working section. The deformable rod has two ends fixed to the working section and the gripping section respectively, and a middle section is defined in-between. The torque adjustment mechanism is installed on the gripping section and includes a knob and an abutting member. The knob is provided for adjusting the abutting member to be proximate to or away from the middle section. The switch is installed on the gripping section and disposed between the middle section and the torque adjustment mechanism. The alarm is installed on the gripping section and electrically connected to the switch. The middle section is in a bending deformation toward the abutting member, when the load of the working section is greater than a set torque, to touch the switch and trigger the alarm to generate a warning signal.

This disclosure has the following effects. At least a portion of the abutting member protrudes from the passive member to ensure that the abutting member is abutted by the switch. Through the adjusting inner thread of the passive member and the adjusting outer thread of the abutting member, the abutting member may be adjusted for the amount of protrusion relative to the passive member. The C-shaped limit slot of the fastener and the positioning column of the knob may limit the rotation stroke of the knob. With the elastic bump of the positioning elastic plate being snapped into one of the corresponding positioning grooves, users may know the completion of setting the torque through hand feel. By the pulling force applied by the elastic element, the deformable rod may restore its position when the working section is separated from the load.

DETAILED DESCRIPTION

Figure 1:
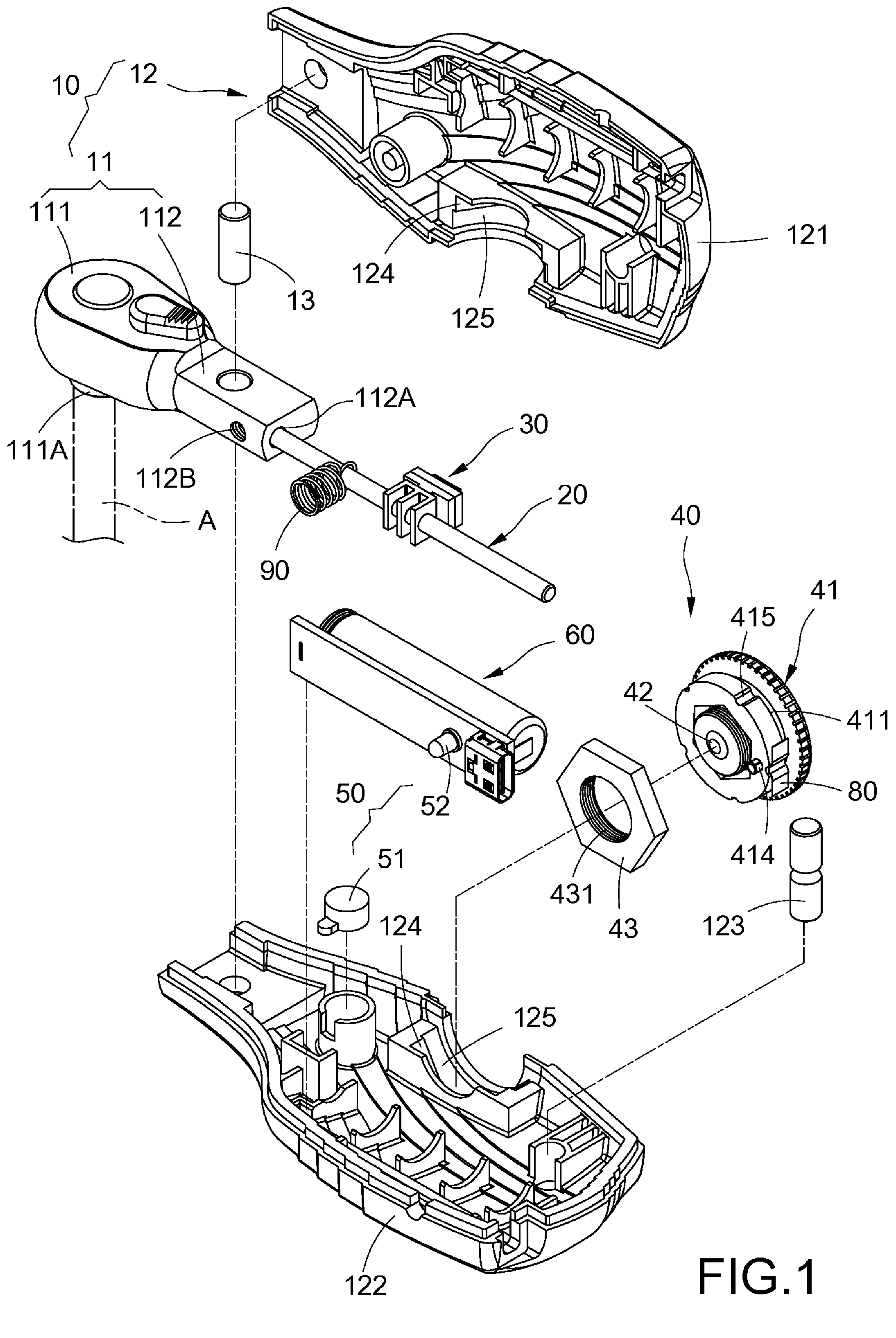
FIG. 1 is a perspective exploded view of this disclosure.
Figure 2:
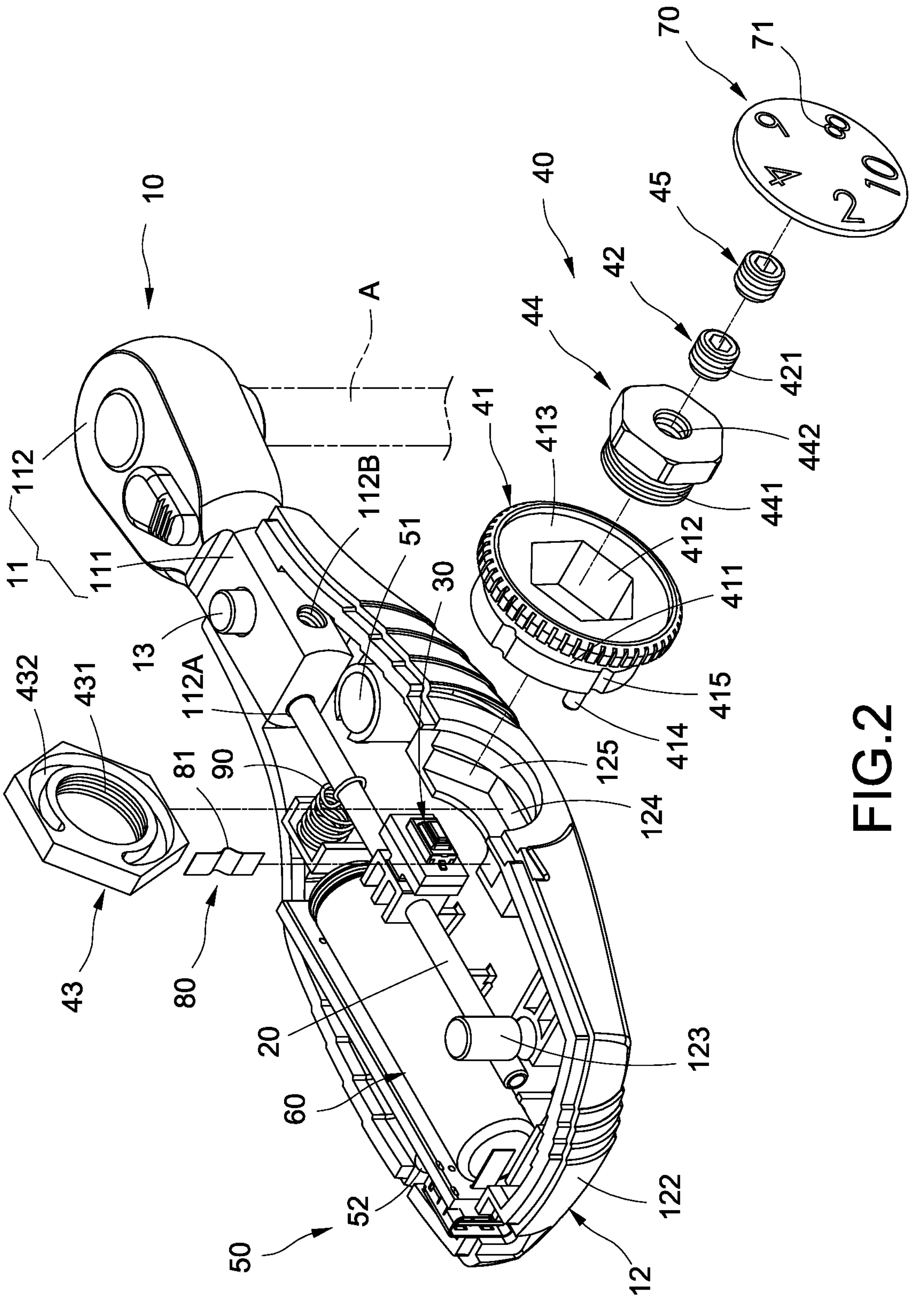
FIG. 2 is a perspective exploded view of this disclosure, viewing from another angle.
Figure 3:
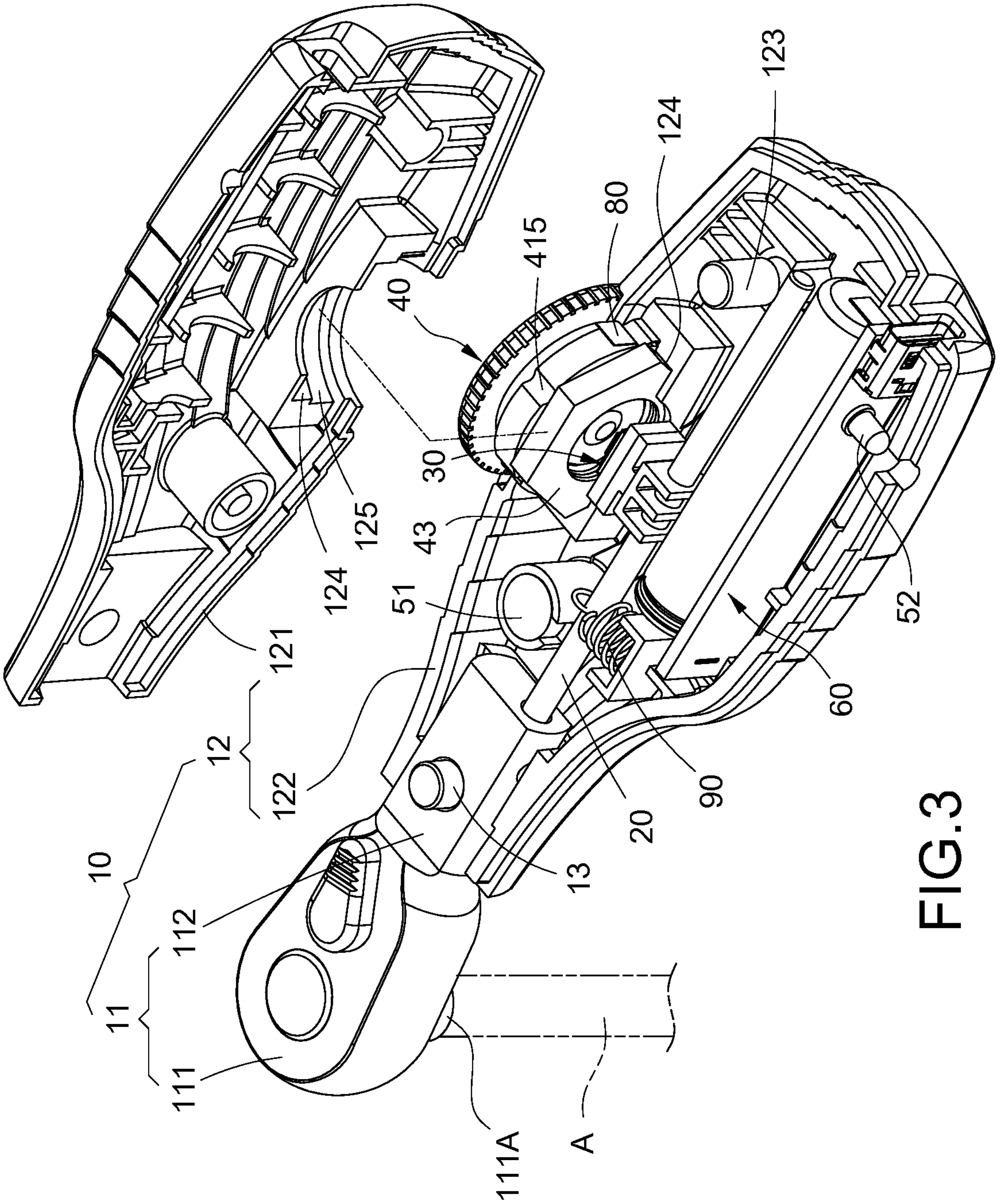
FIG. 3 is a perspective exploded view of this disclosure with a gripping section.
Figure 4:
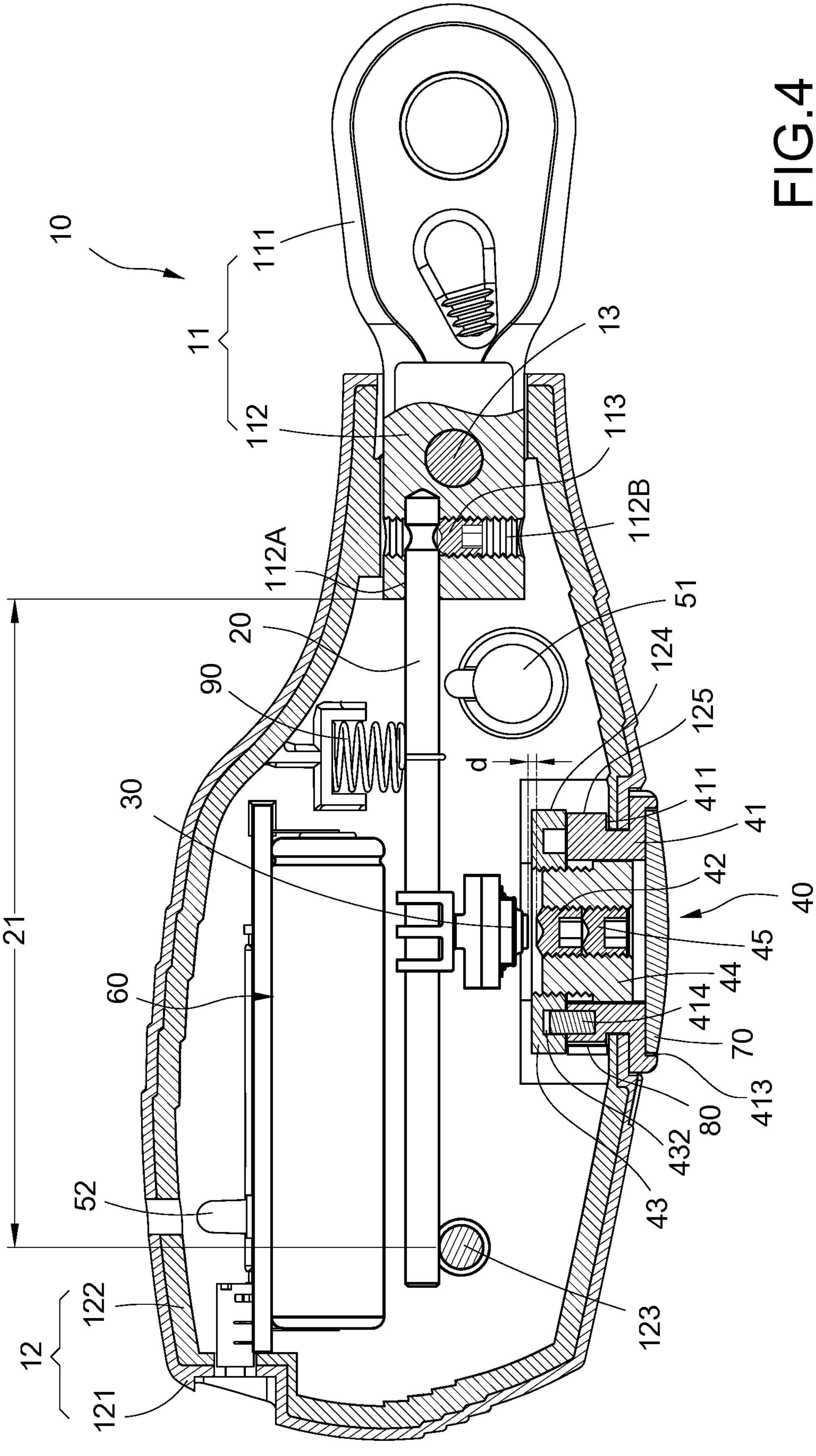
FIG. 4 is a cross-sectional view of this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

With reference to FIGS. 1 to 4 for a torque wrench with an overload warning mechanism in accordance with this disclosure, the torque wrench includes a wrench body 10, a deformable rod 20, a switch 30, a torque adjustment mechanism 40 and an alarm 50.

The wrench body 10 includes a working section 11 and a gripping section 12, and the working section 11 is connected to the gripping section 12. Specifically, the working section 11 includes an exposed part 111 and a buried part 112 which are connected to each other, and the gripping section 12 includes a first casing 121 and a second casing 122 which are engaged with each other. The buried part 112 is movably clamped between the first casing 121 and the second casing 122 of the gripping section 12, and the exposed part 111 is exposed from the gripping section 12. In addition, the exposed part 111 has a tool slot 111A provided for the torque wrench being engaged onto a workpiece A for use. In this embodiment, the buried part 112 has a pivot 13 passing therethrough, and two ends of the pivot 13 are fixed to the first casing 121 and the second casing 122 respectively, so that the buried part 112 is pivotally connected to the gripping section 12, but this disclosure is not limited to such arrangement only.

The deformable rod 20 is rod-shaped and capable of being bent by external forces, and its two ends are fixed to the working section 11 and the gripping section 12 respectively. Specifically, the buried part 112 has a fixing hole 112A, a side of the interior of the gripping section 12 away from the buried part 112 has an abutting part 123. The deformable rod 20 has one end snapped and fixed into the fixing hole 112A, and another end abutting against the abutting part 123, so that the two ends of the deformable rod 20 are fixed by fulcrum, and a deformable and bendable middle section 21 is formed between the two ends of the deformable rod 20. In this way, when the working section 11 is swung by the load using the pivot 13 as a fulcrum, the buried part 112 may drive the deformable rod 20 to swing. Since an end of the deformable rod 20 abuts against the abutting part 123, the middle section 21 of the deformable rod 20 is deformed and bent. In addition, the buried part 112 further has a screw hole 112B communicating with the fixing hole 112A, so that a stop screw 113 may be used and screwed into the screw hole 112B to securely fix the deformable rod 20 into the fixing hole 112A without the risk of separation.

The torque adjustment mechanism 40 is installed to the gripping section 12 and includes a knob 41 and an abutting member 42, and the knob 41 is provided for adjusting the position of the abutting member 42 corresponding to different torque values. Specifically, the knob 41 adjusts the position of the abutting member 42 corresponding to different torque values, so as to move the abutting member 42 to a position near or away from the middle section 21 of the deformable rod 20.

The switch 30 is installed in the gripping section 12 and disposed between the middle section 21 of the deformable rod 20 and the torque adjustment mechanism 40. In this embodiment, a contact distance d is formed between the switch 30 and the abutting member 42, and the knob 41 may adjust the contact distance d between the abutting member 42 and the switch 30 corresponding to different torque values. In this embodiment, the switch 30 is a press-button switch or a touch switch, but this disclosure is not limited to such arrangements only, and any contact type trigger switch 30 may be used. The alarm 50 is installed on the gripping section 12 and electrically connected to the switch 30. In this embodiment, alarm 50 includes a vibration motor 51 and a warning light 52 provided for visually and tactilely alerting the users, but this disclosure is not limited to such arrangement only. For example, the alarm 50 may also include the vibration motor 51, the warning light 52 and a buzzer (not shown in the figures), or any one of the above as long as it may achieve the effect of effectively alerting the users. Specifically, the torque wrench of this disclosure further includes a power supply assembly 60 electrically connected to the switch 30 and the alarm 50 for supplying electric power to the alarm 50, so as to form a loop after it is electrically conducted to the switch 30.

Figure 6:
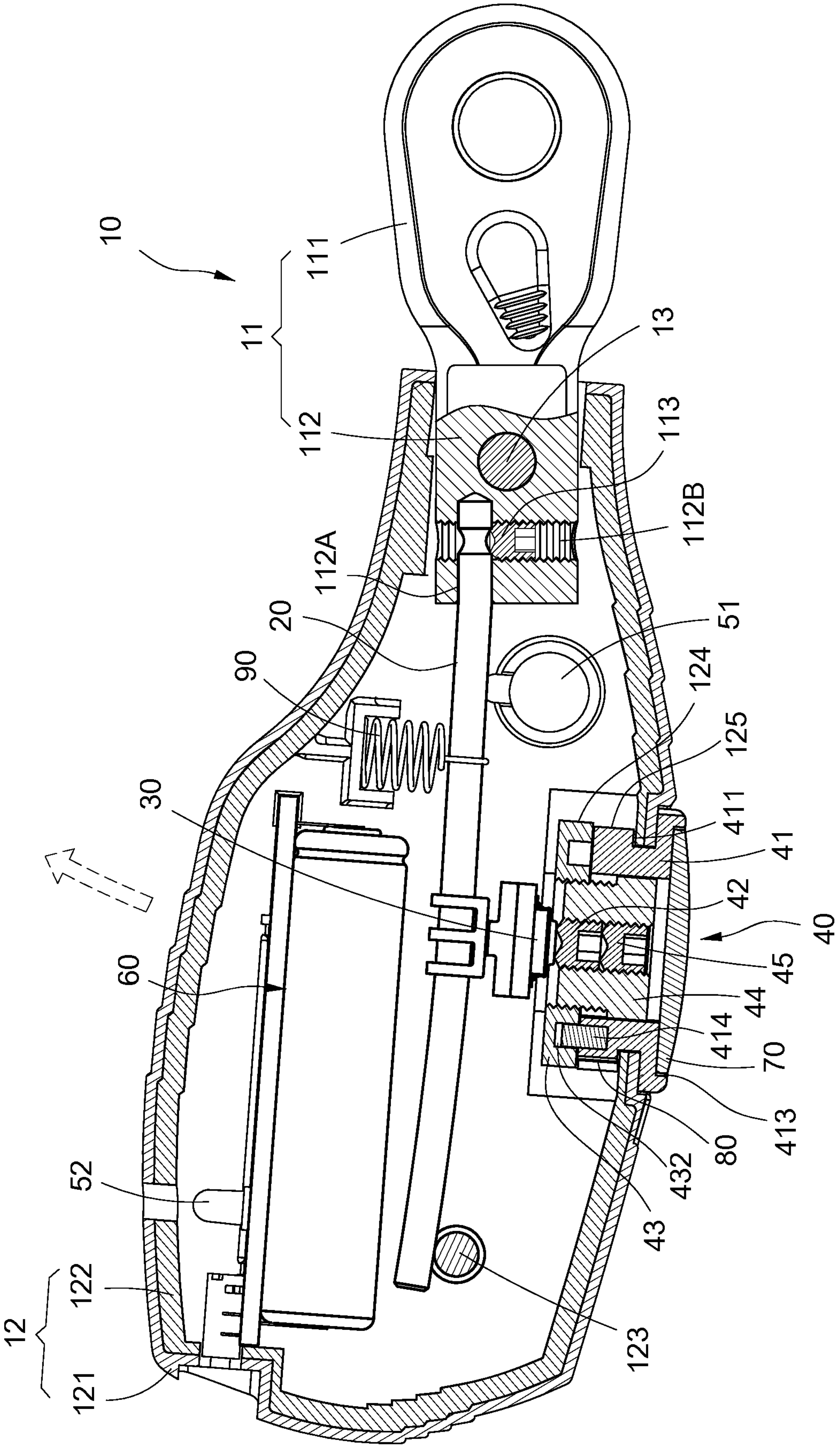
FIG. 6 is a cross-sectional view showing the using status of this disclosure.

When the working section 11 is swung by the load using the pivot 13 as a fulcrum, the middle section 21 of the deformable rod 20 is deformed and bent toward the abutting member 42. When the load of the working section 11 is greater than a set torque, the bending and deformation of the middle section 21 of the deformable rod 20 toward the abutting member 42 may squeeze and press the switch 30 to touch the switch 30 and trigger the alarm 50 to generate a warning signal, so as to achieve the effect of alerting the users. Specifically, when the middle section 21 of the deformable rod 20 of this embodiment is gradually deformed and bent toward the abutting member 42, the contact distance d between the switch 30 and the abutting member 42 may gradually become smaller. When the load at the working section 11 of this embodiment is greater than a torque value set by the torque adjustment mechanism 40, the bending deformation produced by the middle section 21 of the deformable rod 20 may make the contact distance d between the switch 30 and the abutting member 42 to become zero, so as to abut the switch 30 against the abutting member 42 and trigger the alarm 50 to generate a warning signal and achieve the effect of alerting the users as shown in FIG. 6.

In addition, the torque adjustment mechanism 40 further includes a fastener 43 and a passive member 44. The fastener 43 is snapped and fixed into the gripping section 12, and the knob 41 is rotatably arranged corresponding to the fastener 43 and clamped between the gripping section 12 and the fastener 43, and the passive member 44 is movably embedded into the knob 41 and screwed to the fastener 43, and the abutting member 42 is fixed to the passive member 44. Specifically, the fastener 43 has an inner thread 431, and the passive member 44 has an outer thread 441 screwed with the corresponding inner thread 431, so that the passive member 44 may be screwed in or out relative to the fastener 43. In this way, when the knob 41 is rotated, it drives the passive member 44 to rotate, and since the knob 41 is clamped between the gripping section 12 and the fastener 43, therefore, the passive member 44 may be moved to a position in the knob 41 near or away from the fastener 43 to adjust the contact distance d between the abutting member 42 and the switch 30.

The first casing 121 and the second casing 122 of the gripping section 12 jointly have a fixing slot 124 formed at a position corresponding to the fastener 43 and provided for snapping and fixing the fastener 43. In this embodiment, the fixing slot 124 is a non-circular slot, and the outer periphery of the fastener 43 is also in a non-circular shape and in a shape corresponding to the shape of the fixing slot 124, so that the fastener 43 may be fixed effectively without the risk of being rotated. In addition, the first casing 121 and the second casing 122 of the gripping section 12 jointly form a snap slot 125 at the outer periphery of the fixing slot 124, and an end of the knob 41 disposed in the fastener 43 is accommodated in the snap slot 125 and has a stop part 411 formed at a position corresponding to the snap slot 125, and the stop part 411 has a gripping section 12 sapped into the corresponding snap slot 125 to prevent the knob 41 from being detached.

Further, the knob 41 has a transmission slot 412 for embedding the passive member 44, and the transmission slot 412 of this embodiment is a non-circular slot, and the outer periphery of the passive member 44 is also in a non-circular shape and has a shape corresponding to the shape of the transmission slot 412, so that the knob 41 may effectively drive the passive member 44 to rotate without slipping. In addition, at least a portion of the abutting member 42 protrudes from an end surface of the passive member 44 proximate to the switch 30 to ensure that the abutting member 42 is abutted and contacted by the switch 30. In this embodiment, the passive member 44 has an adjusting inner thread 442, and the outer periphery of the abutting member 42 has an adjusting outer thread 421 screwed with the corresponding adjusting inner thread 442 to adjust the amount of protrusion of the abutting member 42 relative to the passive member 44. The fixing manner between the abutting member 42 and the passive member 44 is not limited to the manner of this disclosure. In some embodiments, the torque wrench further includes a stop bolt 45 screwed to the adjusting inner thread 442 and tightly press and fix the abutting member 42, so that the abutting member 42 does not move after it is adjusted to the required amount of protrusion.

It is noteworthy that the amount of deformation of the middle section 21 of each deformable rod 20 may be slightly different, the manufacturer may test it before the product exits the factory and adjust the distance between the abutting member 42 and the middle section 21 of the deformable rod 20. After the torque wrench conforms to the standard torque value, the abutting member 42 is fixed by the stop bolt 45 to avoid the displacement of the abutting member 42. In this way, each torque wrench is ensured to reach the torque value standard, thereby effectively reducing errors, and allowing the user to ensure that the torque value is corresponding to the correct torque value when adjusting the knob 41 to the required torque value.

Figure 5:
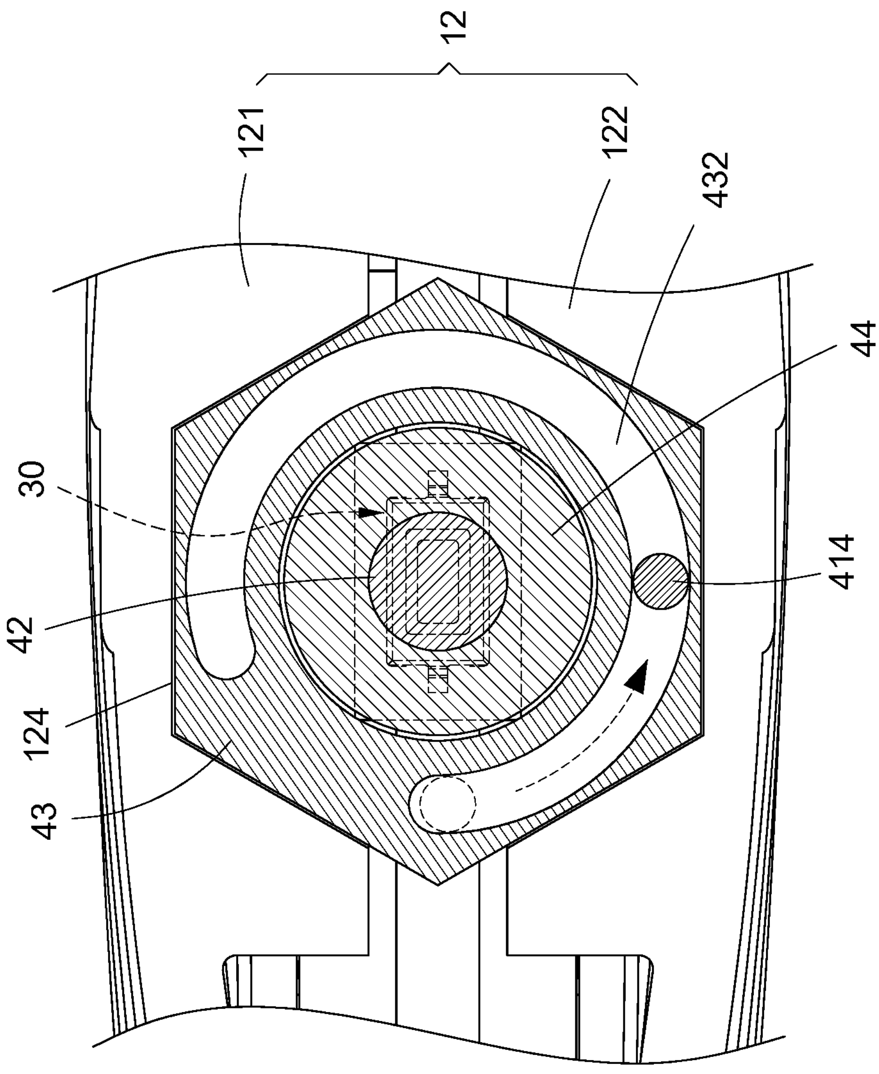
FIG. 5 is a cross-sectional view showing the using status of a knob of this disclosure.

The torque wrench of this disclosure further includes a calibration disc 70 and a positioning elastic plate 80. The top of the knob 41 is concavely provided with an embedding slot 413, and the calibration disc 70 is embedded into the embedding slot 413 of at the top of the knob 41, and the calibration disc 70 is labeled with a plurality of different torque values 71 which are provided for users to know the torque value 71 of the current rotation of the knob 41. In addition, the fastener 43 is provided with a C-shaped limit slot 432 on a side facing the knob 41, and an end surface of the knob 41 facing the faster 43 is convexly provided with a positioning column 414. The positioning column 414 is accommodated in the C-shaped limit slot 432 and its movement is limited in the C-shaped limit slot 432, so as to restrict the rotation stroke of the knob 41 as shown in FIG. 5. The positioning elastic plate 80 is installed to a side of the snap slot 125 and has an elastic bump 81, and the knob 41 is accommodated into one of a plurality of positioning grooves 415 concavely formed at the outer periphery of the snap slot, and the elastic bump 81 is engaged with one of the positioning grooves 415, and when the knob 41 rotates, the elastic bump 81 is switched into a different positioning groove 415. It is noteworthy that each positioning groove 415 of the knob 41 is arranged to be the position corresponding to each torque value 71 on the calibration disc 70, so that when the user turns to a position corresponding to each torque value 71 on the calibration disc 70, the elastic bump 81 of the positioning elastic plate 80 is snapped into the corresponding positioning groove 415, the user may clearly know the setting of the torque value 71 is completed through hand feel.

In addition, the torque wrench of this disclosure further includes an elastic element 90 installed in the gripping section 12 and buckled to the middle section 21 of the deformable rod 20 to apply a pulling force to the middle section 21 of the deformable rod 20 in a direction opposite to the bending deformation, so that when the working section 11 is separated from the load, the middle section 21 of the deformable rod 20 restores its position by the pulling force of the elastic element 90. In this embodiment, the elastic element 90 is a tension spring installed to a side proximate to the working section 11 and capable of restoring the position of the middle section 21 of deformable rod 20 by a smaller pulling force, but this disclosure is not limited to such arrangement only.

Figure 7:
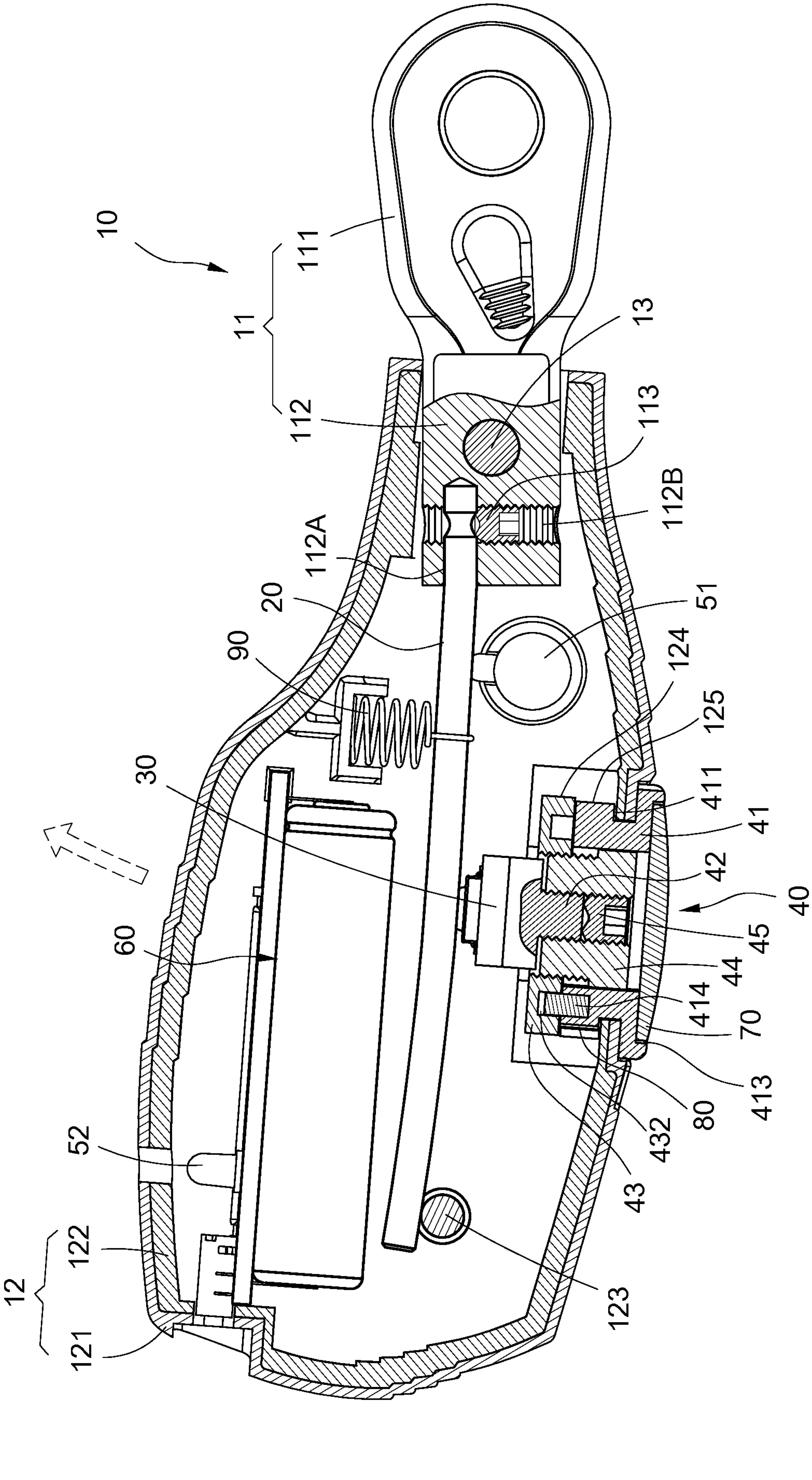
FIG. 7 is a cross-sectional view showing the using status of another embodiment of this disclosure.

With reference to FIG. 7 for another embodiment of this disclosure, the main difference between this embodiment and the previous embodiment is that the switch 30 is installed onto the abutting member 42. Specifically, the switch 30 is installed to the bottom of the abutting member 42 and faces the middle section 21 of the deformable rod 20. In this way, when the middle section 21 of the deformable rod 20 of this embodiment is deformed and bent toward the abutting member 42, the distance between the middle section 21 of the deformable rod 20 and the switch 30 on the abutting member 42 gradually becomes smaller; and when the load of the working section 11 is greater than the torque value set by the torque adjustment mechanism 40, bending deformation produced by the middle section 21 of the deformable rod 20 may make the distance between the middle section 21 of the deformable rod 20 and the switch 30 to become zero, so that the middle section 21 of the deformable rod 20 presses against the switch 30, and the switch 30 is pressed to trigger the alarm 50 to generate a warning signal, thereby achieving the effect of alerting the users.

In summation of the description above, this disclosure achieves the expected effects, overcomes the drawbacks of the related art.

While this disclosure has been described by means of specific embodiments, numerous modifications and variations could be made thereto by those skilled in the art without departing from the scope and spirit of this disclosure set forth in the claims.

What is claimed is:

1. A torque wrench, comprising:

a wrench body, comprising a working section and a gripping section coupled to the working section;

a deformable rod, fixed to the working section and the gripping section respectively by two ends thereof, and comprising a middle section disposed in-between;

a torque adjustment mechanism, installed on the gripping section, and comprising a knob and an abutting member, and the knob configured to adjust the abutting member to a position proximate to or away from the middle section;

a switch, installed in the gripping section and disposed between the middle section and the torque adjustment mechanism;

an alarm, installed on the gripping section and electrically coupled to the switch;

a fastener, placed and fixed in the gripping section;

a passive member, movably embedded in the knob and screwed with the fastener, wherein the abutting member is fixed to the passive member, and at least a portion of the abutting member protrudes from the passive member; and a stop bolt, wherein the passive member comprises an adjusting inner thread, the abutting member comprises an adjusting outer thread disposed on an outer periphery thereof, the adjusting outer thread is screwed with the adjusting inner thread, and the stop bolt is screwed with the adjusting inner thread and fastens the abutting member;

wherein, when load of the working section is greater than a set torque, the middle section is in a bending deformation toward the abutting member to touch the switch and trigger the alarm to generate a warning signal.

2. The torque wrench according to claim 1, wherein the switch is installed on the middle section and turned on by abutment of the abutting member.

3. The torque wrench according to claim 1, wherein the switch is installed on the abutting member and turned on by abutment of the middle section.

4. The torque wrench according to claim 1, further comprising a positioning elastic plate installed in the gripping section and comprising an elastic bump, wherein the knob comprises a plurality of positioning grooves concavely disposed on an outer periphery thereof, and the elastic bump is snapped in one of the positioning grooves.

5. The torque wrench according to claim 1, wherein the knob comprises a transmission slot, the transmission slot is a non-circular slot, and an outer periphery of the passive member is in a shape corresponding to a shape of the transmission slot and embedded in the transmission slot.

6. The torque wrench according to claim 1, wherein the fastener comprises an inner thread, and the passive member comprises an outer thread, and the outer thread is screwed with the inner thread.

* * * * *